(No Model.)

G. MÜLLER.
CANE HANDLE.

No. 360,814. Patented Apr. 5, 1887.

WITNESSES:
Jol. N. Rosenbaum.
Martin Petry.

INVENTOR
George Müller
BY
Goepel Raegener
ATTORNEYS.

UNITED STATES PATENT OFFICE.

GEORGE MÜLLER, OF NEW YORK, N. Y.

CANE-HANDLE.

SPECIFICATION forming part of Letters Patent No. 360,814, dated April 5, 1887.

Application filed December 9, 1886. Serial No. 221,051. (No model.)

*To all whom it may concern:*

Be it known that I, GEORGE MÜLLER, of the city, county, and State of New York, have invented certain new and useful Improvements in Cane-Handles, of which the following is a specification.

This invention relates to an improved handle for canes, umbrellas, parasols, &c., in which is arranged a taper and matches for lighting said taper, so that the cane or umbrella stick can be used for illuminating purposes, for lighting cigars, &c.

The invention consists of a handle for canes, umbrellas, &c., having a tubular portion on its shank, a sliding socket arranged in said tubular portion, a taper supported by said socket, a device for sliding the socket and taper in the tubular portion, and a receptacle for matches, as will appear more fully hereinafter, and finally pointed out in the claims.

Figure 1:
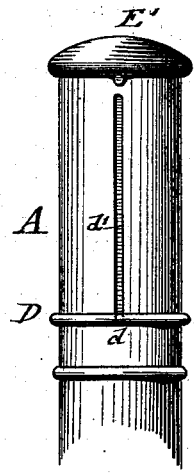
Figure 2:
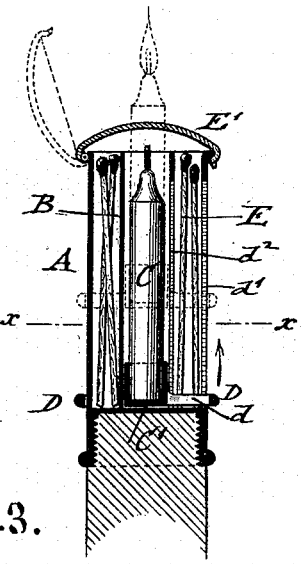
Figure 3:
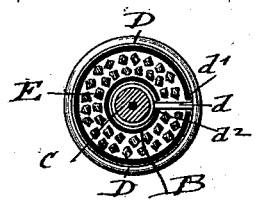
Figure 4:
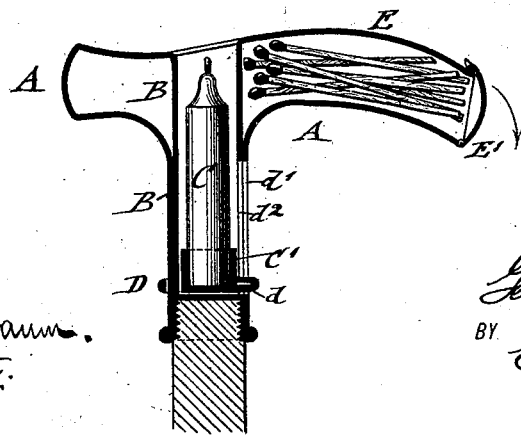

In the accompanying drawings, Figure 1 is a side view of my improved handle for canes, umbrellas, &c. Fig. 2 is a vertical central section of the same; Fig. 3, a horizontal section on the line $x\ x$, Fig. 2. Fig. 4 is a vertical longitudinal section of a different form of a handle made according to my invention.

Similar letters of reference indicate corresponding parts.

A in the drawings represents the handle of a cane, umbrella, or other article, which handle is made of metal or other suitable material, and provided with a tubular portion, B, in its shank. In the tubular portion B is arranged a taper, C, which is applied to a socket, C', that is moved up and down in the tubular portion B by a slide-ring, D, or other device, which is connected with the socket C' by a pin, $d$, said pin being guided in longitudinal slots $d^2$ $d'$ of the tubular portion B and the shank of the handle, as shown in Fig. 2.

Between the tubular portion B and the shank of the handle is formed an annular space, E, which serves as a match-receptacle, said space being closed by a cap, E', which is hinged to the shell of the handle and retained thereon by a clasp device, or screwed on, or otherwise attached or left open, as desired. The match-receptacle may also be arranged in the form shown in Fig. 4, in which the handle is made with a cross-piece, the match-receptacle being then provided with a hinged cap at its outer end, while the taper-receptacle may be left open or closed, as desired.

For lighting the taper it is raised to a sufficient height above the handle and then lighted with a match from the receptacle. After use it is moved back into the tubular portion B. The handle of the cane or other article can thus be used for illuminating purposes by lighting the taper, and combines therewith the advantage of a match-receptacle.

Having thus described my invention, I claim as new and desire to secure by Letters Patent—

1. A handle for canes, umbrellas, &c., provided with a tubular portion in the shank, a socket in the tubular portion adapted to hold a taper, and a device for sliding the socket and taper in said tubular portion, substantially as set forth.

2. A handle for canes, umbrellas, &c., provided with a tubular portion in the shank of the handle, a sliding socket within the same adapted to hold a taper, a device for sliding the socket and taper, and a match-receptacle arranged around the tubular portion, substantially as set forth.

3. A handle for canes, umbrellas, &c., provided with a hollow shank, a tubular portion in said shank, a sliding socket in said tubular portion for containing a taper, a device for sliding the socket and taper, a match-receptacle arranged around the tubular portion, and a cap for closing the tubular portion and match-receptacle, substantially as shown and described.

In testimony that I claim the foregoing as my invention I have signed my name in presence of two subscribing witnesses.

GEORGE MÜLLER.

Witnesses:
PAUL GOEPEL,
CARL KARP.